United States Patent [19]
Bergmann

[11] Patent Number: 5,384,876
[45] Date of Patent: Jan. 24, 1995

[54] QUASI-HERMAPHRODITIC-TYPE OPTICAL FIBER CONNECTION

[75] Inventor: Ernest E. Bergmann, Fountain Hill, Pa.

[73] Assignee: AT&T Corp, Murray Hill, N.J.

[21] Appl. No.: 100,526

[22] Filed: Jul. 30, 1993

[51] Int. Cl.⁶ ............................................. G02B 6/38
[52] U.S. Cl. ............................................. 385/64; 385/82
[58] Field of Search ............ 385/64, 70, 72, 82, 385/66, 68, 84

[56] References Cited

U.S. PATENT DOCUMENTS

| | | | |
|---|---|---|---|
| 4,205,898 | 6/1980 | Matthews et al. | 385/72 |
| 4,239,334 | 12/1980 | Johnson | 385/64 |
| 4,545,644 | 10/1985 | DeVeau, Jr. et al. | 350/96.21 |
| 4,615,581 | 10/1986 | Morimoto | 350/96.21 |
| 4,636,033 | 1/1987 | Gagen | 350/96.21 |
| 4,662,713 | 5/1987 | Davies et al. | 350/96.20 |
| 4,691,986 | 9/1987 | Aberson, Jr. et al. | 350/96.21 |
| 4,787,704 | 11/1988 | Knecht et al. | 385/64 |
| 4,856,866 | 8/1989 | Freeman et al. | 385/72 |
| 4,973,126 | 11/1990 | Degani et al. | 350/96.21 |
| 5,082,377 | 1/1992 | Jarret et al. | 385/60 |
| 5,212,745 | 5/1993 | Miller | 385/64 X |
| 5,220,630 | 6/1993 | DeVeau, Jr. et al. | 385/64 |

Primary Examiner—John D. Lee

[57] ABSTRACT

A quasi-hermaphroditic connection comprises first and second substantially identical connector assemblies. Each connector assembly comprises a cylindrical plug member having a central bore containing an optical fiber, the end of which is made flush with the front face of the plug member. A support rod is affixed to the plug member with its axis parallel thereto and has a portion extending beyond the front of the plug member. The two plug members are pushed towards each other until the faces abut with the extended portions of each support rod contacting the other support rod and forming a V-groove therewith in which both plugs rest. The two connector assemblies are clamped together on either side of the region in which the faces abut, with no clamping forces being exerted in that region.

18 Claims, 5 Drawing Sheets

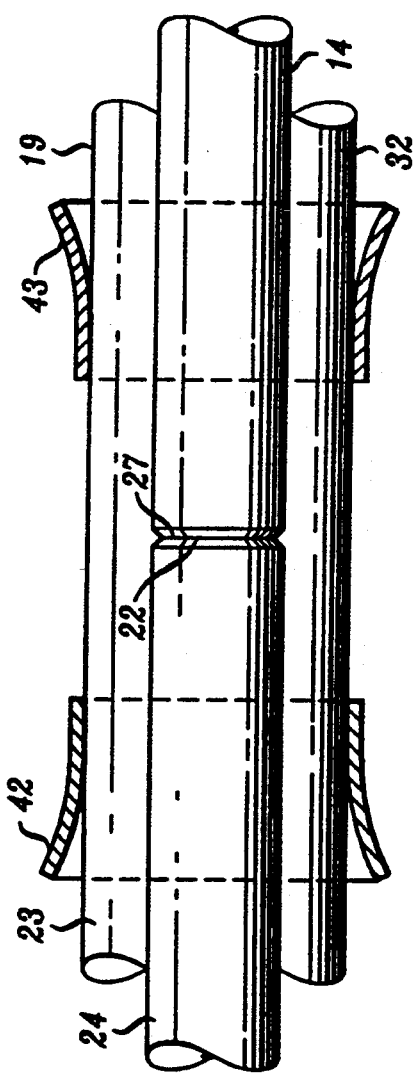

5,384,876

QUASI-HERMAPHRODITIC-TYPE OPTICAL FIBER CONNECTION

FIELD OF INVENTION

This invention relates to connectors for optical fibers and, more particularly, to a quasi-hermaphroditic type connection for such fibers and method of assembly of the connection.

BACKGROUND OF THE INVENTION

Optical fiber splices and connectors, collectively designated hereinafter as "connectors", are necessary components of any optical fiber system. Inasmuch as optical fibers have finite lengths, it is necessary that means be provided for splicing the ends of two such fibers together. Also, where breaks occur, some means, such as a connector, of joining the broken fiber is necessary. In addition, in virtually all optical fiber transmission systems, the fiber or fibers terminate at either active or passive devices to which they must be connected by suitable connections. Such connections also make it possible to rearrange or reroute transmission paths. By "connection" is meant the assembled member which joins and holds the fibers. Such connections usually comprise one or more connector assemblies or subassemblies and a clamping or holding means.

Regardless of the nature of the connection, whether splice or connection to a device, the principal criteria for establishing such a connection are that the connector must join two fiber ends with minimum insertion loss and that it must be mechanically stable in the working environment. Low insertion loss depends upon fiber alignment, the optical flatness of the ends of the fibers to be joined, and a minimum gap between the fiber ends. Stability depends primarily upon the mechanical design of the connector, with particular emphasis upon the minimization of thermal effects. In those connectors, where the fibers being joined abut, the mechanical design must maintain the abutting relationship despite application of external forces.

In the prior art, efforts to meet these criteria have often resulted in relatively costly connectors, primarily because of the inclusion of numerous precision machined parts, and often because of undue complexity. Such precision and complexity may be acceptable in trunk lines and central offices, where connector costs represent only a small fraction of the total cost of the installation. On the other hand, in field installations, in which labor costs dominate, the connector cost can be a substantial percentage of the total installation cost and, therefore, is desirably minimized where possible.

The mechanical design of the connector can also affect the cost of its installation, in most cost sensitive applications, such as in the field, i.e., locations remote from a central office, and in short haul data communication, for example. Where the connector is mechanically complex, the installation can be complicated and lengthy, after requiting a high level of skill on the part of the technician. In a field installation, it is desirable that the technician performing the splice or connection be able to do so in a reasonably short time, preferably without the use of special tools, and that such installation not require the exercise of any special skills on the part of the installer.

One prior art connector device that meets, at least to some degree, the aforementioned criteria in a structure that is relatively simple is disclosed in U.S. Pat. No. 4,691,986 of Aberson, Jr. et at. The connector of that patent comprises a pair of contiguous fiber carrying plug members which are supported in an abutting relationship at three or more contact lines along their lengths by elongated alignment rods or by a corrugated alignment sleeve. "Contiguous" plugs are plugs that have been cut from a piece of bored cylindrical stock, the abutting faces in the connector being formed by the cut.

The alignment rods are arranged in a triangular pattern and define a central opening into which the plugs are inserted and slid forward until they abut each other. The assembly thus formed is maintained in the triangular form by a suitable triangular spring clip which applies sufficient compressly force to the assembly to hold the plugs firmly against the support rods and to maintain the abutting relationship of the plugs. The connector requires, for proper alignment of the plugs, three or more support rods or ferrules or a preformed corrugated sleeve. In the case of the support rods, assembly can be somewhat tedious inasmuch as initially there is no support for the support rods themselves to hold them in their proper spaced relationship. In addition, the technician must carry the necessary components with which he assembles a connector, which, in the case of a splice, for example, can number six components. In assembling the connector, the technician pushes the plugs into the ends of the support rod assembly toward the center until the plugs abut. Inasmuch as the butting faces of the plugs, and the fiber contained therein, are precisely ground to a high degree of flatness, it is highly desirable that these faces not be subjected to possible damage. However, damage to the face of a plug, such as chipping, might possibly occur as the plug is pushed into the rod assembly.

A connector similar to the Abetsort, Jr. et al. connector is shown in U.S. Pat. No. 4,545,644 of DeVeau et al., wherein three support rods support two abutting plugs, as in the Aberson, Jr. et al. connector. Two of the alignment rods have curved "flats" thereon which enable the plugs to be closely aligned by rotating each of them on its supporting "flat". The alignment procedure requires means for passing fight through the abutting plugs and measuring the fight scattered at the junction of the fibers in the plugs. Thus, it can be seen that the installer must carry with him the necessary equipment for monitoring the fight scattered or insure that such is available at the installation site. In addition, he must be able to insure that it is possible to pass light across the junction at the installation site.

A particular class of connection known as hermaphroditic (or quasi-hermaphroditic) connectors, is also present in the prior art. Such connectors comprise, instead of male and female members which mate to form a connection, a pair of substantially similar or identical connector assemblies which are joined to form a complete connection. The advantage of such a connection principally resides in the elimination of differently configured members which mate to form a complete connection or coupling, inasmuch as both connector members of a hermaphroditic connection are identical. The technician or installer is not required, therefore, to anticipate whether he will require a male or a female connector member or assembly for any particular job.

SUMMARY OF THE INVENTION

The present invention is a hermaphroditic-type connection and method of assembling it, which comprises a first cylindrical plug member having a bore extending longitudinally therethrough, the bore having been formed with a high degree of concentricity relative to the outer diameter of the plug. The plug is adapted to receive in the bore an optical fiber to be connected, the end of which is cleaved and ground to be flush with the front face of the plug, which is then polished to a high degree of flatness or smoothness. Attached to the plug in a non-rotatable relationship is an elongated cylindrical support rod or ferrule, preferably made of the same material as the plug, which may be ceramic, glass, stainless steel, or other suitable material. One end, i.e., the front end, of the support rod extends beyond the front face of the plug for a substantial distance. The combination of plug, rod and attaching means forms a first connector assembly.

A second plug, in all respects, substantially identical to the first plug, and adapted to receive therein an optical fiber for connection to the fiber of the first plug has attached thereto a second elongated cylindrical support rod, the front end of which extends beyond the front face of the second plug, thereby forming a second connector assembly substantially identical to the first connector assembly. When the two assemblies are assembled to form a connection, after the fibers have been inserted into their respective plugs and polished, the first and second assemblies are slid together into position where the front faces of the two fiber containing plugs and hence, the fibers, abut. The support rod attached to the first plug slides along the second plug in contact therewith to form support therefor, and the support rod attached to the second plug in like manner forms a support for the first plug. The two support rods are in contact with each other along a portion of their lengths and together form a V-groove in which the plugs are supported. The plugs and support rods are maintained in contact by means for example, a suitable spring clip or clips which preferably embrace the assembled connector and affix the plugs and rods in position. The assembled connection resembles, to some extent, the connection shown in the Aberson, Jr. et al. patent. However, the configuration of the sub-assemblies or connector assemblies provide protection for the precision front faces of the plugs while the connector is being assembled, usually within the spring clip(s). Additionally, the supporting V-groove formed by the support rods is not affected to any deleterious extent by differences in the support rod diameters, hence, these rods do not have to be formed with a high degree of precision. Any alteration of the V-groove resulting from such a difference in diameters applies equally to both plugs, hence, their relative positions are unchanged.

Inasmuch as the sub-assemblies are identical, they form a quasi-hermaphroditic type of coupler and, therefore an installer or technician is not required to carry in his kit both male and female mating sub-assemblies, it being necessary only to have two of the identical sub-assemblies to construct a connection and a spring clip or other means for clamping and holding the sub-assemblies of the connection in their operative position.

In one illustrative embodiment of the invention a spring clip for holding the sub-assemblies together has a substantially triangular cross-sectional shape of varying dimensions. The ends of the dip define an area through which the sub-assemblies are easily inserted without being forced together by the clip. The clip tapers from the ends to regions adjacent the ends where the cross-sectional area is reduced to define sub-assembly gripping portions, and then tapers to a central region between the reduced portions where the area is increased so as not to bear against the end faces, i.e., the abutting region, of the plugs. Such a clip configuration facilitates assembly of the connection while reducing the potential for damage to the tips or faces of the plugs, and the extended support rod portions also protect the front faces of the plugs as the connector assemblies are introduced and forced into the clip. In a preferred embodiment, the central portion is eliminated, resulting in two identical clips, one clip associated with each connector assembly.

BRIEF DESCRIPTION OF THE DRAWINGS

FIG. 5 is a partial cross section plan view of an alternative clipping arrangement for the assembled connection.

DETAILED DESCRIPTION

Figure 1:
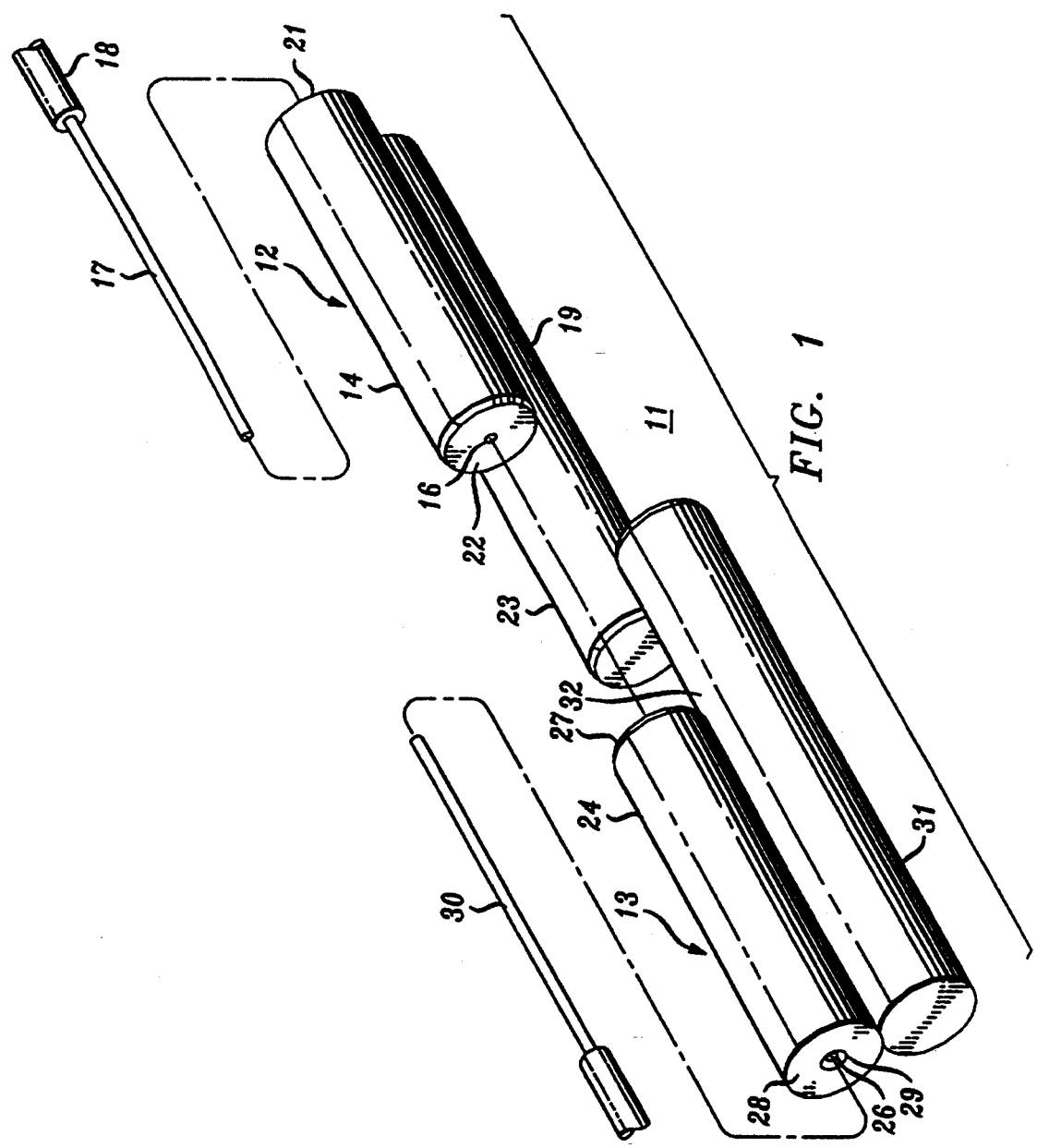
FIG. 1 is a perspective view of the two sub-assemblies forming a connector showing their relationship during assembly.

FIG. 1 depicts an initial step in forming a connection 11 embodying the principles of the invention which comprises first and second substantially identical connector assemblies or sub-assemblies 12 and 13 oriented for being joined to form connection 11. Sub-assembly 12 comprises a plug member 14 having a central bore 16 for receiving an optical fiber 17 stripped of its coating 18. Affixed to plug 14 in a non-rotatable manner, as by connecting or by the use of spring clips, for example, is a support rod or ferrule 19. Rod 19 extends in a direction from the region of the rear end 21 of plug 14 well past the front face 22 thereof, as shown, thus producing an unencumbered support section 23. The sub-assembly 12 as manufactured, has a high degree of parallelism between plug 14 and rod 19. In like manner, sub-assembly 13 comprises a plug member 24 having a bore 26 and front and rear faces 27 and 28, respectively. End face 28 is provided with a conical opening 29 leading into bore 26 so that insertion of a fiber 30 into bore 26 is facilitated. Although it is not shown, end face 21 of plug 14 has a similar conical opening 35. Affixed to plug 24 in a non-rotatable manner is a support rod or ferrule 31 which has a portion 32 extending beyond front face 27. It is preferable that in order that possible damage be minimized during assembly of connector 11, the front end faces 22 and 27 of the plugs 14 and 24, and the front faces of rods 19 and 31 are chamfered at their outer edges, as shown.

Prior to assembly of the two connector assemblies 12 and 13, suitable cement is introduced into bore 16 of plug 14 and fiber 17 is then inserted into the bore, passing therethrough and protruding out beyond front face 22. The protruding portion of the fiber 17 is then cleaved to flush, or nearly so, with face 22, which is then ground and polished to a high degree of flatness or a slight, smooth convexity. In like manner, fiber 30 inserted into and through bore 26 in plug 24 is also cemented, cleaved, and polished with front face 27. The sub-assemblies 12 and 13, oriented as shown in FIG. 1, are then slid together until front faces 22 and 27 abut. When these faces are abutting, portion 23 of ferrule passes under and supports plug 13, and portion 32 of ferrule or rod 31 passes under and supports plug 14. When rod 19 is axially parallel with plug 14, and rod 31 is axially parallel with plug 24, then, assuming substantially uniform diameters and surfaces, portion 23 of rod 19 and portion 32 of rod 31, after assembly, are parallel to and support plugs 24 and 14 respectively. In the connection 11 as finally assembled, the two sub-assemblies 12 and 13 are clamped together by suitable means, such as shown in FIG. 3, which will be discussed more fully hereinafter.

Figure 2B:
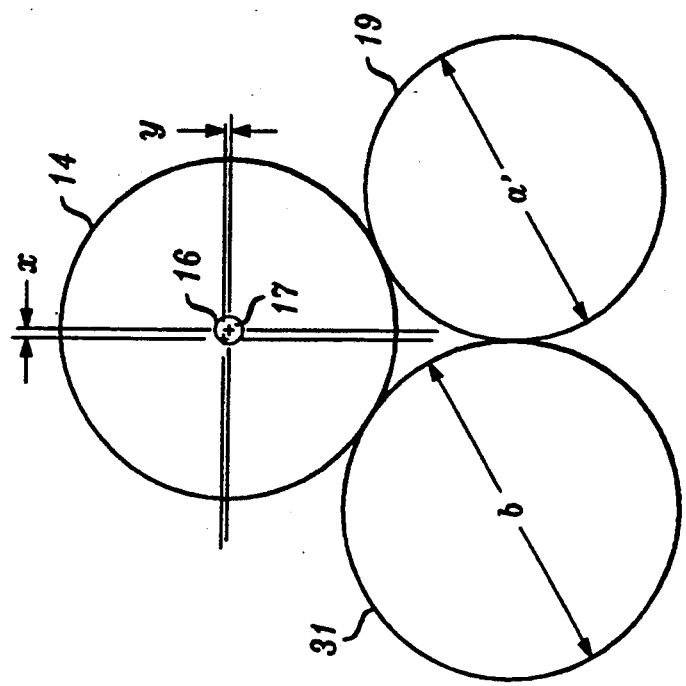
FIGS. 2A and 2B are a diagrammatic view of the relationship of the support rods and the plugs of the connection as assembled.
Figure 2A:
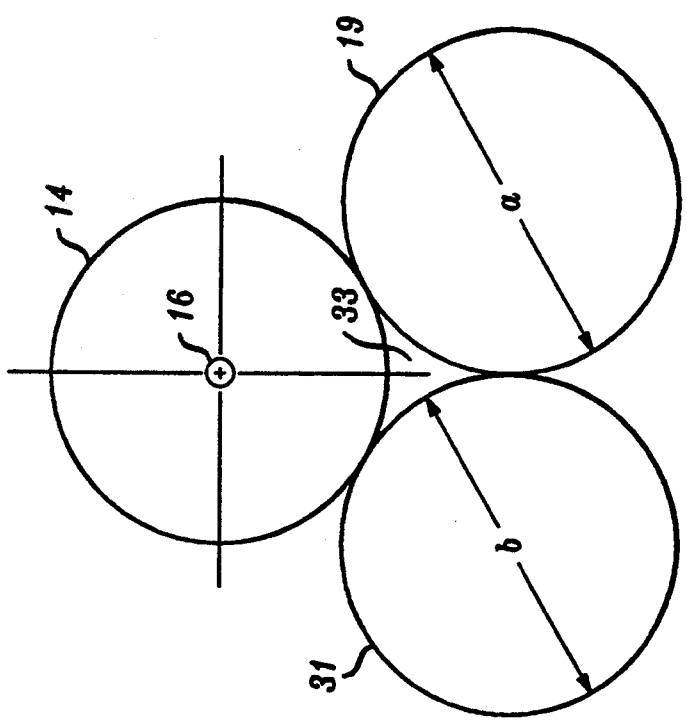

The connection of the invention as thus far discussed requires precision only the bores in the plugs 12 and 13. For a low loss coupling of the fibers, the concentricity of 16 and 26 with the outer diameters of plugs 14 and 24 is preferably held to one micron or less variation. Present day manufacturing techniques are sufficiently advanced to maintain such a high degree of concentricity. In addition, the bore diameter in each plug is preferably not more than one to two microns greater than the diameter of either the fiber 17 or fiber 30. The cement material, which may be hot melt or epoxy, is introduced into the bores 16 and 26 in liquid form and has a centering effect upon the fiber within the bore. In FIG. 2A, there is shown a cross-section of the assembled sub-assemblies showing how plug 14, for example, is supported by both rod 19 and rod 31 of diameters a and b, respectively, where a is substantially equal to b. Rods 19 and 31 are in contact with each other along the length of portions 23 and 32 (shown in FIG. 1), respectively, and form a curved V-groove 33 within which plug 14 is nested and supported. The outside diameters of rods 19 and 31, and hence portions 23 and 32, do not have to be equal, as shown in FIG. 2B. In FIG. 2B, the diameter of rod 19 is shown as a', with a' being less than b. As can be seen, the axis of bore 16 and hence fiber 17 is, in such case, shifted slightly as indicted by x and y. However, the effect on plug 24, bore 26, and fiber 30 is identical, with their axes being shifted the same mount, hence, the bores 16 and 26 and hence fibers 17 and 30, remain aligned. Thus, the ferrules or rods 19 an 31 do not require any particular precision other than that each have a constant diameter along its length. On the other hand, rods 19 and 31 and plugs 14 and 24 are preferably made of the same material so that thermal expansions and contractions will have the same effect on all components, thereby maintaining the alignment and abutment of plugs 14 and 24, and hence, fibers 17 and 30, the same under varying operating conditions.

Figure 3:
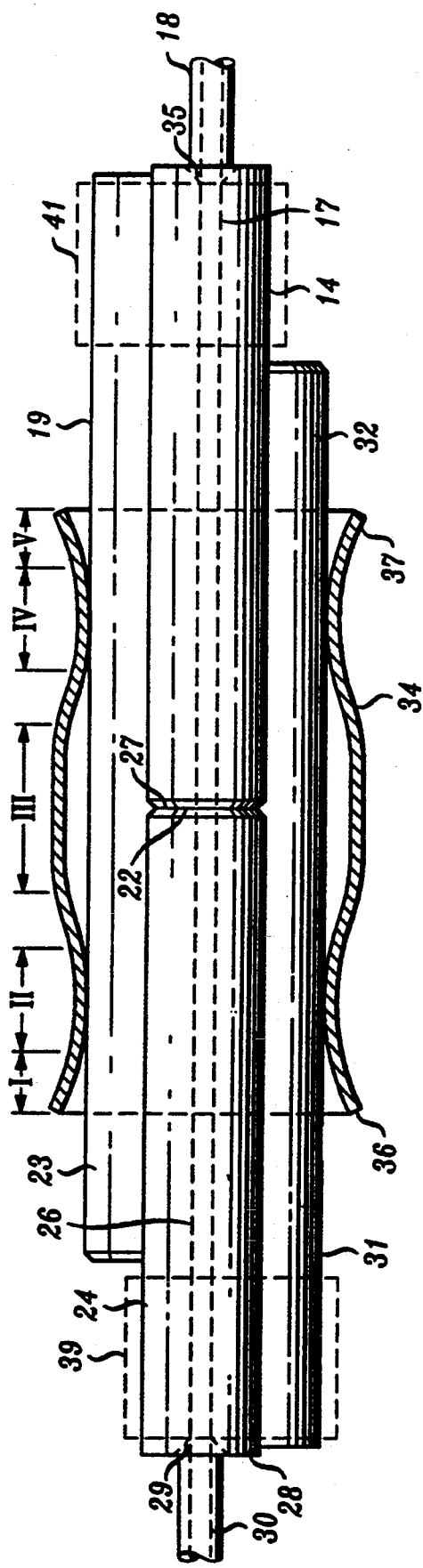
FIG. 3 is a partial cross-section plan view of an assembled connection with clip.

FIG. 3 is a partially sectional plan view of the assembled connection of the invention, wherein the connector assemblies or sub-assemblies 12 and 13 are clamped in their operative position by means of a spring clip 34 made of elastic and resilient, preferably non-corrosive, material such as, for example, beryllium-copper. Clip 34 defines a triangular shaped cross-section into which sub-assemblies 12 and 13 are pushed until plug faces 22 and 27 abut. The configuration of clip member 34 is best seen under reference to FIGS. 3 and 4. As can be seen in FIG. 3, the configuration of clip 34 varies along its length, and in the drawing has been divided into sections I, II, III, IV, and V which sections are depicted in cross-sectional perspective in FIG. 4 with the exception of section V which is substantially identical to section I, but reversed. At each end (Section I and V), 36 and 37, clip 34 is flared to define a cross-sectional area that is greater than the cross-sectional area of the assembled sub-assemblies so that either end of the assembled sub-assemblies may be introduced into the clip at either end without the necessity of force. The wall of the clip 34 tapers from the flared ends 36 and 37 to a smaller, gripping area (Sections II and IV) which grips the sub-assemblies tightly, and expands to a central region (Section III) which does not grip the sub-assemblies. The individual sub-assemblies may be introduced into clip 34 from either end, and pushed into abutment and they are then firmly held by Sections II and IV. Alternatively, the sub-assemblies may be pre-assembled and the clip 34 may then be pushed over the assembly and along the length thereof. Clip 34 is provided with a longitudinally extending slot 38 which may be temporarily pried open to facilitate installing the clip on the assembly, or installing the assembly in the clip. In Section III, no direct forces are applied to the abutting region, thereby minimizing the risk of damage to the plug end faces.

As pointed out hereinbefore, plug 14 is non-rotatably affixed to rod 19, and plug 24 is non-rotatably affixed to rod 31. It is, of course, possible to cement these elements together. It is also possible to clamp the elements to each sub-assembly together by suitable spring clamping means 39 and 41 as shown in dashed lines in FIG. 3.

In FIG. 5, there is shown a clamping arrangement wherein two spring clamping members 42 and 43 are used instead of the single member 34 shown in FIG. 3. The configuration of the members 42 and 43 is substantially the same, with one being reversed relative to the other in the assembled connector. It can readily be seen that member 42 is configured similar to sections I and II of member 34 in FIG. 3, and member 43 is configured similar to sections IV and V of member 34. Thus, each of the connector assemblies 12 and 13 has a clamping member or clip associated therewith, thus forming two substantially identical sub-assemblies of a true hermaphroditic connection. Other configurations are also possible wherein the clamping throes are on either side of the abutting region, with no direct throes being applied in that region.

Figure 4:
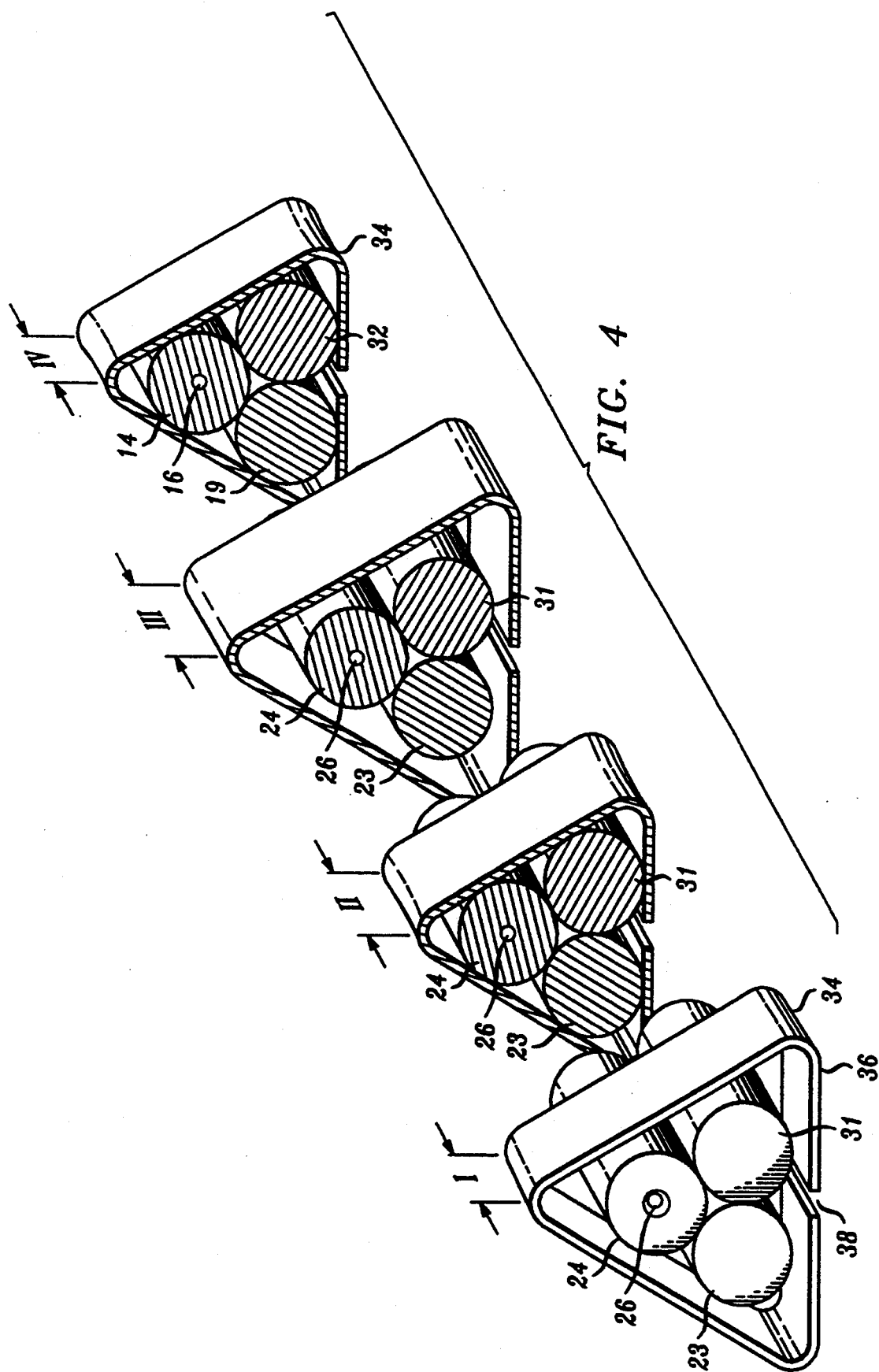
FIG. 4 is a sectional, perspective view of the connection of FIG. 3 illustrating the relationship of the clip and the sub-assemblies and different regions along the length of the connection.

Alternative clamping and holding members may also be used in place of the clips of FIGS. 3, 4 and 5, such as, for example, coil springs, or spring loaded roller bearings.

From the foregoing it can be readily seen that the connection of the invention is quite simple, involves a minimum of precision parts, does not require special tools to assemble and, being at least quasi-hermaphroditic in nature, does not require the technician to differentiate between male and female mating elements. In addition, only two sub-assemblies, which may be, and preferably are, pre-fabricated, and a clamping member or members are all the parts necessary for the technician or installer to transport to the field installation, for example. Although the foregoing has emphasized field installation, the connector of the invention is useful in virtually any application and may be, for example, manufactured in its assembled form as a fiber termination.

I claim:

1. An optical fiber connection comprising:

a first cylindrical plug member having a bore extending axially and longitudinally therethrough for receiving a stripped portion of an optical fiber extendable therethrough and fixed relative thereto;

a second cylindrical plug member having a bore extending axially and longitudinally therethrough for receiving a stripped portion of a different optical fiber extendable therethrough and fixed relative thereto;

each of said plug members having a front thee and a rear face;

a first support rod affixed to said first plug member having an axis substantially parallel to the axis of said first plug member and extending beyond the front face thereof;

a second support rod affixed to said second plug member having an axis substantially parallel to the axis of said second plug member and extending beyond the front face thereof;

said first and second support rods being in contact with each other along at least a portion of their lengths and forming a substantially V-shaped groove, said first plug member being located in said groove and supported by said first and second support rods and said second plug member being located in said groove and supported by said first and second support rods in axial alignment with said first plug member with said front faces in abutting relationship; and means for maintaining said first and second plug members in their abutting relationship.

2. An optical fiber connection as claimed in claim 1 wherein one end of the optical fiber extending through said first plug member is flush and co-planar with the front face thereof.

3. An optical fiber connection as claimed in claim 2 wherein one end of the optical fiber extending through said second plug member is flush and co-planar with the front face thereof.

4. An optical fiber connection as claimed in claim 1 wherein said first and second plug members and said first and second support rods are composed of the same material.

5. An optical fiber connection as claimed in claim 1 wherein each of said bores in said first and second plug members is substantially concentric with the outer diameter of its respective cylindrical plug member.

6. An optical fiber connection as claimed in claim 1 wherein said means for maintaining said first and second plug members in abutting relationship comprises spring means surrounding and in contact with said first and second plug members and said first and second support rods over at least a portion of the length thereof.

7. An optical fiber connection as claimed in claim 6 wherein said spring means is in contact with said first and second plug members on either side of the region wherein said front times of said plug members abut, and out of contact with said plug members in said region.

8. An optical fiber connection as claimed in claim 1 wherein said means for maintaining said first and second plug members in abutting relationship comprises:

a first clamping member surrounding and in contact with said first plug member and said first and second support rods; and a second clamping member surrounding and in contact with said second plug member and said first and second support rods.

9. An optical fiber connection as claimed in claim 8 wherein said first and second clamping members are disposed on either side of the region in which said front faces abut.

10. For use in hermaphroditic-type optical fiber connection having first and second substantially identical mating optical fiber containing members for maintaining the ends of the optical fibers in abutting relationship;

a connector comprising a first plug member having a front face and a rear face and having a bore extending axially therethrough adapted to receive and hold an optical fiber;

a cylindrical support rod affixed to said plug member, said support rod having a portion thereof in contact with said plug member with its axis substantially parallel to the axis of said plug member; and said support rod having a front portion extending beyond said front face of said plug member.

11. A connector assembly as claimed in claim 10 and further including a clamping member surrounding and in contact with said plug member and said support rod, said clamping member being adapted to receive the support rod of a mating connector assembly.

12. A connector assembly as claimed in claim 11 wherein said clamping member is located between said front and rear faces of said plug member.

13. For use in an optical fiber connection having first and second substantially identical mating members, each of the members comprising an optical fiber containing plug and a support rod therefor and affixed thereto;

a clamping member for holding the mating members with the plugs and optical fibers contained therein in abutting relationship;

said clamping member having a first portion defining a cross-sectional opening having a first area greater than the area occupied by the assembled plugs and support rods, a second portion defining a cross-sectional opening having a second area less than said first area and adapted to grip and hold the assembled plugs and support rods in contact With each other, and having a third portion having a third area greater than said second area, said third area being spaced from said first portion and contiguous with said second portion.

14. A clamping member as claimed in claim 13 and further having a fourth portion defining a fourth area equal to said second area and adapted to grip and hold the assembled plugs and support rods in contact with each other.

15. A clamping member as claimed in claim 14 and further having a fifth portion defining a fifth area greater than said fourth area, said fifth portion being spaced from said third portion and contiguous with said fourth portion.

16. A clamping member as claimed in claim 15 wherein each of said portions is joined to the adjacent portions by tapered portions of said clamping member.

17. A method of assembling an optical fiber connection having first and second plug members each having a bore therein for receiving an optical fiber and having a front face, and a support rod affixed to each plug member and having an extended portion extending beyond the front face of the plug member, said method comprising the steps of:

inserting and affixing an optical fiber in the bore of each of said first and second plug member and making one end of each fiber flush with the front face of its plug member;

moving the front faces of the plug members towards each other to cause the support rods to contact each other and the plug members over a finite distance until the front faces are in abutment; and clamping each of the plug members to both of the support rods.

18. The method as claimed in claim 17 including the step of clamping the plug members to both of the support rods on either side of the region where the front faces abut and leaving that region free of any clamping force.

* * * * *

UNITED STATES PATENT AND TRADEMARK OFFICE
CERTIFICATE OF CORRECTION

PATENT NO. : 5,384,876
DATED : January 24, 1995
INVENTOR(S) : Ernest E. Bergmann It is certified that error appears in the above-indentified patent and that said Letters Patent is hereby corrected as shown below:

Column 7, line 10, change "thee" to --face--

Signed and Sealed this

Ninth Day of May, 1995

Attest:

BRUCE LEHMAN

*Attesting Officer*    *Commissioner of Patents and Trademarks*